(12) United States Patent
Armingaud et al.

(10) Patent No.: US 7,318,163 B2
(45) Date of Patent: Jan. 8, 2008

(54) SYSTEM AND METHOD FOR REAL-TIME DETECTION OF COMPUTER SYSTEM FILES INTRUSION

(75) Inventors: Francois-Dominique Armingaud, Paris (FR); Fernando Daniel Pedrazzoli Pazos, Madrid (ES)

(73) Assignee: International Business Machines Corporation, Armonk, NY (US)

( * ) Notice: Subject to any disclaimer, the term of this patent is extended or adjusted under 35 U.S.C. 154(b) by 678 days.

(21) Appl. No.: 10/753,180

(22) Filed: Jan. 6, 2004

(65) Prior Publication Data

US 2004/0181691 A1   Sep. 16, 2004

(30) Foreign Application Priority Data

Jan. 7, 2003   (EP) .................................. 03368001

(51) Int. Cl.
  *G06F 11/00*   (2006.01)
  *G06F 3/00*    (2006.01)
(52) U.S. Cl. .................... 713/193; 726/22; 726/23; 726/24; 719/328; 719/329
(58) Field of Classification Search ................ 713/193, 713/164–167, 176, 179; 726/26–27, 22–24; 719/328–329
  See application file for complete search history.

(56) References Cited

U.S. PATENT DOCUMENTS

| | | | |
|---|---|---|---|
| 5,440,723 A | | 8/1995 | Arnold et al. ............... 395/181 |
| 5,557,798 A | * | 9/1996 | Skeen et al. ................... 705/35 |
| 6,269,409 B1 | * | 7/2001 | Solomon ..................... 719/329 |
| 7,051,044 B1 | * | 5/2006 | Fera et al. ................ 707/104.1 |
| 2002/0026605 A1 | * | 2/2002 | Terry ............................ 714/37 |
| 2003/0163718 A1 | * | 8/2003 | Johnson et al. ............. 713/193 |
| 2004/0064732 A1 | * | 4/2004 | Hall ............................ 713/201 |
| 2004/0078568 A1 | * | 4/2004 | Pham et al. ................. 713/165 |
| 2004/0107361 A1 | * | 6/2004 | Redan et al. ................ 713/201 |
| 2004/0168078 A1 | * | 8/2004 | Brodley et al. ............. 713/200 |

OTHER PUBLICATIONS

SGI Chapter 8. Monitoring Changes to Files and Directories. http://techpubs.sgi.com/library/tpl/cgi-bin/getdoc.cgi/0650/bks/SGI_Developer/books/IIDsktp_IG/sgi_html/ch08.html#LE33384-PARENT. techpubs library: Nov. 7, 2001.*
Microsoft TechNet. Windows 2000 Services. http://www.microsoft.com/technet/prodtechnol/windows2000serv/deploy/prodspecs/win2ksvc.mspx. TechNet: Jul. 1, 2001.*
"The MD5 Message-Digest Algorithm", Rivest, R., and S. Dusse—RFC 1321—MIT Laboratory for Computer Science, RSA Data Security Inc., Apr. 1992.

* cited by examiner

*Primary Examiner*—Christopher Revak
*Assistant Examiner*—Kari L Schmidt
(74) *Attorney, Agent, or Firm*—Schmeiser, Olsen & Watts; William H. Steinberg

(57) ABSTRACT

A system and method for real-time detection of computer system files intrusion consists in taking advantage of an existing Application Programming Interface (API) dedicated to the creation, modification and deletion of files in order to detect in real-time illegal modification of any vital file or directory of a computer system.

8 Claims, 3 Drawing Sheets

SYSTEM AND METHOD FOR REAL-TIME DETECTION OF COMPUTER SYSTEM FILES INTRUSION

TECHNICAL FIELD

The present invention relates to computer security in general and in particular to real-time detection of computer system files modifications.

BACKGROUND OF THE INVENTION

Typically, any computer system operated by a user in a standard usage calls for a number of system files, including program files and data files, among which some are not supposed to be modified frequently which are called here "vital files". This is also the case for other devices operating in an unattended way, such as the so-called, NFS and other file servers, DNS/BIND and other name servers, database servers, communication servers, gateways, web servers, and any type of server using a computing device driven by an operating system.

In a network environment, a System Administrator is the only person authorized to modify those vital programs and system files either on the computer itself or from a centralized monitoring computer (Manager/Administrator machine). More and more crackers, hostile hackers or intruders try to compromise these files in order to gain later access to the system. New system leaks are regularly discovered, leading to so-called "exploits" allowing almost anybody—from the inside or from the outside of a Company—with or without gaining the System Administrator privileges for a while. Those means may include—but not limited to—"race conditions", buffer overflows, stack overflows, etc.

As soon as the intruder gains the System Administrator privilege access, he/she will modify some system files and/or data files in order to enter the system more easily at a later time, should the breach he came in by be filled in.

State of the art of solutions to detect such kind of intrusion is first to compute the well-known "MD5 signature" of all the vital files, at computer installation time and before the computer is connected to any network, and then to store these computed MD5 signatures in a safe place (e.g. on a diskette which will be set read-only once written, on a CD/R, or by sending them securely on another computer on the network, either in a crypted form than can be cross-checked, or preferably in a write once/read many mode). Complete details on computation of MD5 signature may easily be found in the literature and particularly in "*The MD5 Message-Digest Algorithm*" (Rivest, R., and S. Dusse—RFC 1321—MIT Laboratory for Computer Science, RSA Data Security Inc., April 1992).

U.S. Pat. No. 5,440,723 from the Assignee discloses an automatic immune system for computers and computer networks. In the operated method, periodic monitoring of a data processing system to check for anomalous behavior that may indicate the presence of an undesirable software entity and automatic scanning for occurrences of known types of undesirable software entities are performed. Remedial action are taken if they are discovered, among which the extraction and identification of signature from the executable code portion and the adding of the signature to a signature database. The immediate use of the signature by a scanner provides protection from subsequent infections of the system, and also a network of systems, by the same or an altered form of the undesirable software entity.

MD5 signature based solutions are implemented on some known commercial products such as "Tripwire", a free software in its former open-source versions and a commercial software in its present licensed ones, or such as the "Enterprise Security Manager" product from Symantec Corporation.

Using the MD5 signature is an interesting approach, because changing just one bit in a file totally changes its MD5 signature, but also because there is no way for the intruder to generate a new file having the same MD5 signature. So if a file is modified by an intruder, its MD5 signature is necessarily changed. However, it remains that one has to check all the files on a regular basis, by applying an auto-checking procedure on each computer and collecting the results on a security log that is to be analyzed by the System Administrator or by a software tool. The drawbacks of this approach is that if the checking is done too often, the computer resources are intensively solicited, and on the contrary if the checking is made at larger time intervals, the intruder will have more available time to experiment with the compromised system before he/she is detected.

In the majority of the client environments as illustrated on FIG. 1-*a* these checking are done every night, for example around 3 a.m., thereby leaving on the average twelve hours to the intruder to both cause a lot of trouble on the system. Moreover he/she gets also a lot of time to restore a sane situation before the checking begins. Even the system time stamps associated the last operations on each file can be modified when the intruder has System Administrator's access, thereby covering his/her traces. The local system logs have the same vulnerability.

Thus, there is a need for a system and method detecting offensive intrusions, that does not consume resources uselessly and that operates in real-time, by the use of a system interrupt whenever a vital file is accessed for modifications.

The subject invention herein solves the aforementioned problems in a new and unique manner that has not been part of the art previously.

SUMMARY OF THE INVENTION

It is therefore the object of the invention to provide a system and method to detect in real-time all modifications of vital files on a computer system.

In accordance with a preferred embodiment, the present invention is operated in a computer network having an administrator computer coupled to at least one user computer. The user computer is having at least one application program interface that generates a system call for any event related to the user computer's regular system files. The method consists in detecting in real-time any access to vital system files of the user computer and comprises the steps of:

a. at boot time, declaring to the at least one application program interface the vital system files as a protected set of system files;
b. detecting any system call related to the protected set of system files;
c. upon the detection of at least one system call:
  simultaneously, raising an automatic interrupt 'I' command and sending a message to the administrator computer; and
  identifying which at least one vital system file of the protected set of system files is pointed by the at least one system call.

The invention may be operated on any computer system running on any operating system and coupled to an administrator computer through any kind of network link.

The method may be implemented on any computer system using a computer program product stored on computer usable medium and comprising computer readable program means for causing the computer system to perform the method as described in the appended claims.

BRIEF DESCRIPTION OF THE DRAWINGS

The above and other objects, features and advantages of the invention will be better understood by reading the following more particular description of the invention in conjunction with the accompanying drawings wherein.

DETAILED DESCRIPTION OF THE INVENTION

Figure 1A:
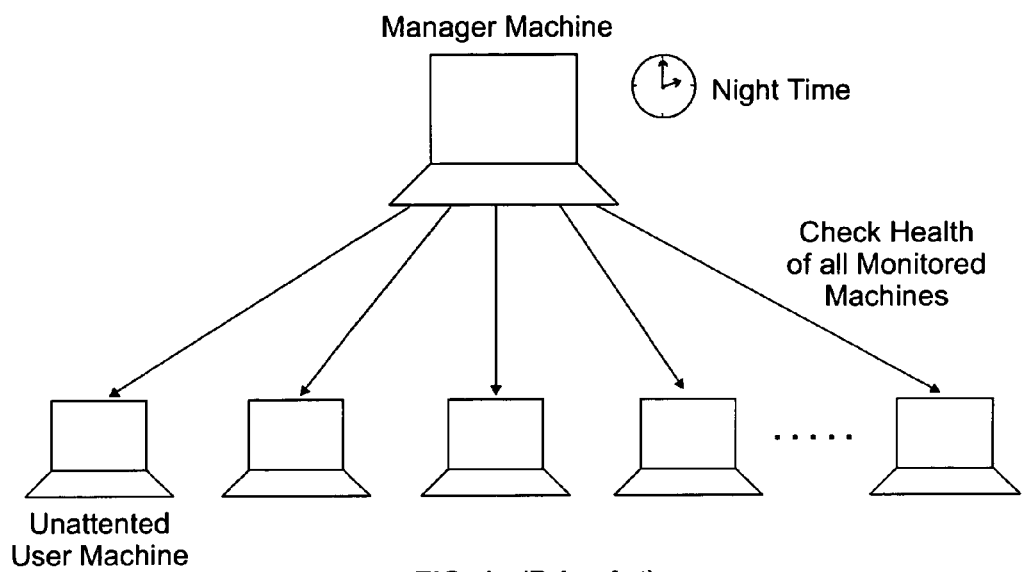
FIGS. 1-a and 1-b show simplified views of a checking computer environment in prior art and in the present invention.

Before referring to the figures, it is to be noted that the inventors have made use for the security purpose of the present invention, of a feature that is already present in computer systems but for a completely different use that has no relation at all to security. The novel concept behind the invention is to take advantage of existing Application Programming Interface (API) dedicated to the creation, modification and deletion of files in order to detect in real-time— that is, exactly at the very time it occurs—an illegal modification of any vital file or directory of a computer system.

The creation or deletion of a file is an operation that implies modifications of another file generally called its "directory". So the term 'file' in this description is used to indicate either a simple file, i.e. a file that contains either data or programs, or a directory file, i.e. a parent file that contains both the name and location of a plurality of simple files.

The APIs used may be the well-known "ChangeNotify" API of the WINDOWS operating systems (WINDOWS is a trademark of Microsoft Corp.) or those equivalent System Calls of others operating systems, such as LINUX (LINUX is a trademark of Linus Torvalds)—where an equivalent API, used by the graphical interface (named KDE3) is called "dnotify" in the 2.4 kernel—or such as any UNIX (UNIX is a trademark of UNIX System Laboratories) or UNIX-like (for instance POSIX-compliant) system using the "FAM" ("File Alteration Monitor") developed by SGI (SGI is a trademark of Silicon Graphic Inc.) for accurate real-time window contents management, or any similar APIs used to synchronize the file information displayed in computer windows with the real files on the system.

The skilled person at the lecture of the following preferred embodiment which is made in the Windows environment will easily apply all the principles to systems, open-source or not, where the "ChangeNotify" API or one of its aforementioned equivalents does not exist. For these systems, a simple modification of the 'kernel "open"' routine by any team having access to the source code would provide the necessary interrupt command to operate the present method. The kernel 'open' is, in any operating system, the mandatory point of passage to allow an application, whether running from superuser—also called "administrator"—mode or regular user mode to open any file on that operating system.

The "ChangeNotify" is thus the Windows API that monitors events related to files and directories. The ChangeNotify API informs the kernel of an active computer to send a signal to an API caller (in Windows normal operations this caller is the graphic interface itself) whenever a file or a directory that is specified for that API is modified so that any window displaying it can be warned to reflect that change. The kernel is the core of the operating system and acts between user programs and hardware devices. The kernel is started at boot time and, while running, cannot be modified on the fly. So any information stored in the kernel itself (or in a table handled within the kernel space) can be considered immune to attacks.

Figure 1B:
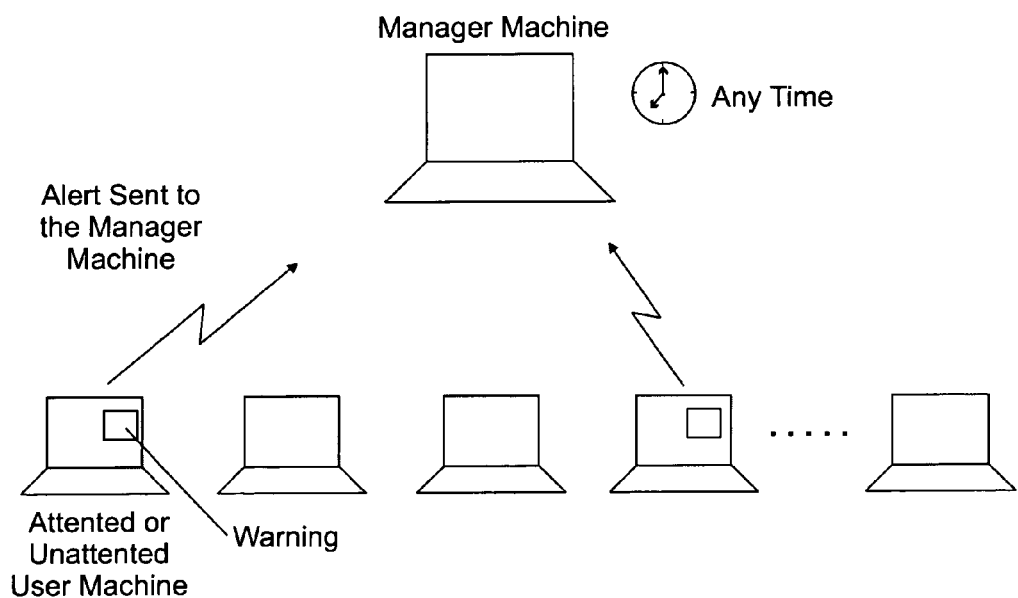

Referring now to the drawings, and first to FIG. 1-b, a conceptual scheme illustrates the innovative approach proposed by the inventors which highlights the main differences as regard to prior art previously discussed with FIG. 1-a. It is first to be appreciated that the user machines connected to the Manager machine may be either in an attended or in an unattended mode and thus the unattended mode required by the prior art is no more a limitation with the use of the present intrusion detection process. If an intruder either directly from a user machine or remotely through a network connection modifies a vital file, an alert is immediately and automatically raised and sent to the Manager machine to inform the System Administrator of the modification whatever the status of the user machine. It is also to be appreciated that the user machine may have various means, lately discussed to inform the user, the Administrator of the intrusion.

Figure 2:
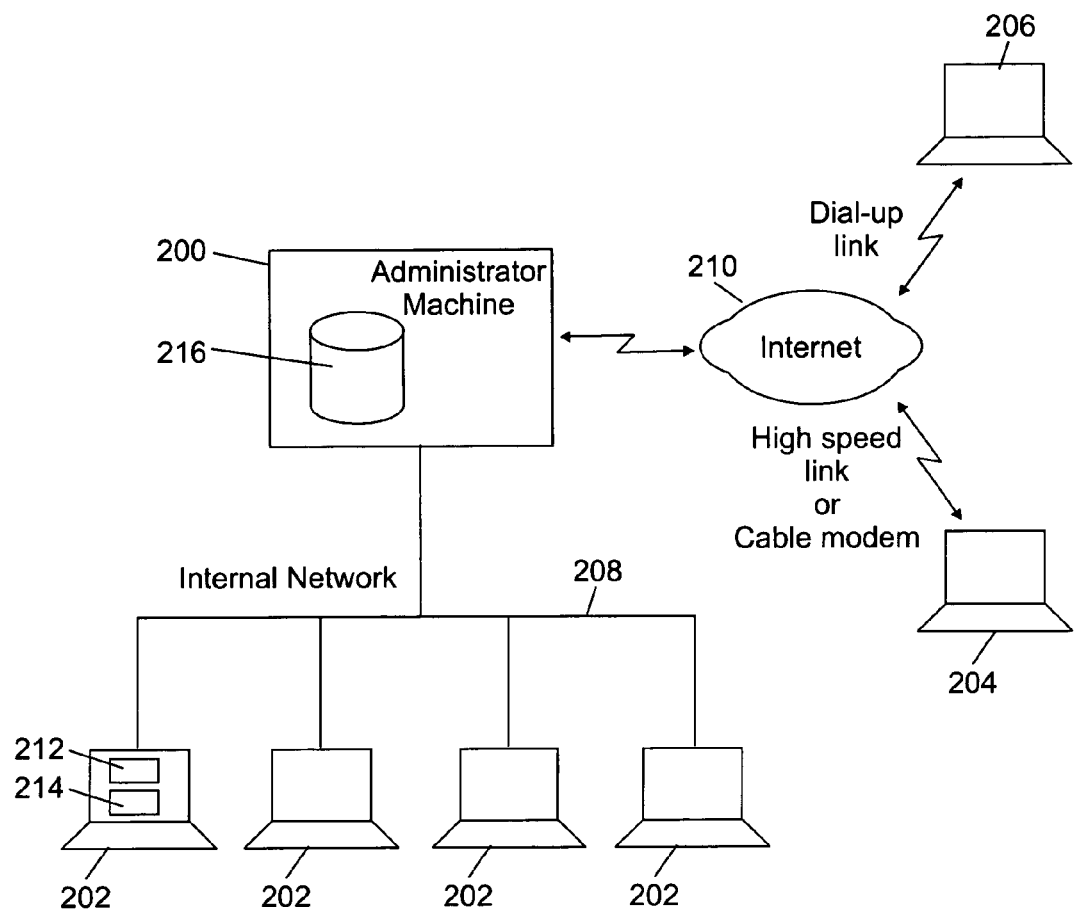
FIG. 2 is a more detailed view of a computer network environment in which this invention applies.

FIG. 2 is a general view of a Windows OS computer network environment in which this invention may apply. As already shown on FIG. 1-b, there is an Administrator machine 200 that is able to collect and store in a database (216) integrity information about a plurality of internal and/or external user computer systems (202,204,206).

The internal user computer systems may be office computers (202) connected to the administrator machine by an internal network (208) such as any Local Area Network. The external user computer systems may be home-office computers (204) or nomad computers (206 for traveling users) connected by the Internet (210) through links such as high speed link, cable modem or dial-up link.

Each user computer system may initialize its operating system (212) at boot time to allow application programs to become active and those application programs perform calls to invoke the procedures of the APIs (214). Among those calls, one may invoke the 'ChangeNotify' API and declare to it which vital regular files or directories will have to be monitored for changes from that moment on. In the case of directories, the call may also declare whether this monitoring also applies to the whole set of files and—recursively— sub directories it refers to, which will be the general case.

Examples of such directories whose modification attempts should be monitored in real-time are \WinNT (including its files and all sub directories among which \WinNT\Command) in Windows NT or 2000 systems. Similarly, the /bin and /etc in Linux and other UNIX-like systems, and directories containing either vital programs or vital data in so-called "proprietary systems" should also be monitored in real-time.

The call may declare which interrupt should be raised when such modification occur, as it will be detailed later. These operations are performed at boot time before starting any network program to ensure that no corruption can occur from the outside at that time.

Figure 3:
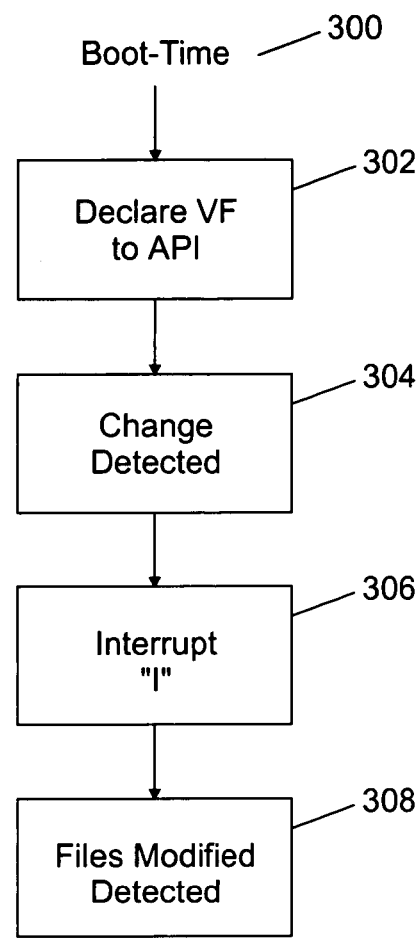
FIG. 3 is a flow chart depicting the basic intrusion detection sequence according to the invention.

FIG. 3 is a flow chart depicting the basic intrusion detection sequence according to the invention. At initialization time of a user computer (boot time 300), a set of vital files "VF" is sent to a series of 'ChangeNotify' or equivalent APIs (box 302). The list of the vital files is declared in a file or a database to be further described.

Thereafter, the user may work on its computer and operate any action. When a "delete" or "open or modification" system call is detected in real-time on one of the vital files (box 304) an automatic interrupt 'I' command is raised (box 306). This interrupt is caught by an asynchronous routine (also known as a daemon) which raises an alert within the system in real time (box 308). Optionally, the same information may also be sent to another system in real-time for example to determine if a repair of the just changed file is necessary or not, i.e. If it is an unauthorized change.

Identification of the files to be monitored is kept in either a flat file or in a database (216), according to both the needed monitoring granularity and the ease of maintenance. Preferably, the flat file is crypted for more safeness. The whole structure is loaded into a table under control of the kernel located in a kernel space. The structure each entry in the flat file or database as well as in the table may preferably be the following one:full path of what is to be monitored, indication whether this specification is recursive—that is, applies to all sub directories—, and indication whether the entry specifies that the file should be included or excluded of the monitored file list. The latter is useful for a class of programs which keeps user data and/or some customization files in one of their own sub directories instead of using the registry and the "My Documents" directory in Windows, or the/ home directory in Linux and Unix-like systems.

Both the table or database and the code that uses it belong to the files registered at boot time as monitored files, so an intruder has no hope of fooling the system by changing them, even if the intruder knows either the key used to crypt the flat file or the database password depending on the solution chosen. This enforces security in a considerable way.

As previously said, the alert may be raised in any form and in particular such as a message displayed on the computer display or on an alternate screen or on a printer, but also by a network card or a modem, or by an audible alarm too and so on. . . The user being warned in real-time that the computer's vital files are being modified at a time when they should not, may take the decision to unplug its computer immediately from the network to prevent further damage. However, as such a modification can be done at any time particularly when the user is not in front of the computer, the present invention may include additional mechanism to detect which files were modified.

In normal mode the ChangeNotify or the dnotify API informs the daemon that was registered to this API that something has changed, but nothing is more specified. When these APIs are used to watch a mere directory in a window it is not important because the whole directory can then be rescanned in less than one second. Moreover, these APIs are not normally used to detect malicious modifications, but just regular operations, so they rely on the system's datetime stamp, which an intruder in some cases may manage to leave unchanged though the contents of the file did change.

The problem of file identification is enlarged in an environment where thousand of system files that contained in a complex hierarchy of directories, plus a MD5 signature to compute on every one of them are to be watched. Moreover, by the time a complete inspection of these files is made, some other files may have been modified as well, making the first report unreliable itself.

In a first embodiment, a plurality of daemons as many as there are unique directories—without recursion—to watch, are launched at boot time in order to have as many daemons as sub directories, plus one. Whenever a daemon is awaken by interrupt "I", this daemon knows which precise one-level directory it is watching, and just has to scan this one. This allows a sub-second response time at the reasonable cost of multiplying the number of instances of a daemon. The inventors have checked that a 1400 MHz AMD will typically compute 100 MD5 signatures per second on a set of 1 MB files. The cost is reasonable because the daemon instances consume no CPU time as long as they are not awaken, and share the same code and common data, only their "personalized", also known as "own" data, using memory, a resource which is now very cheap on computers, and that will not differ much whether the list of files is kept in one daemon or splitted into many daemons.

If many daemons, they can also be programmed to monitor one another, just to ensure none of them has been killed for a while. Daemons will restart themselves automatically under control of the operating system when so defined, but any daemon uses at startup time its configuration data, which could be modified during a specific short time, the time between the moments when the daemon is killed and restarted in a particular case:when that daemon is the one that monitors the set of vital files. For that reason, the daemon names are preferably chosen at random at boot time so an intruder cannot determine which exact daemon monitors the security files.

In another embodiment, only one daemon is launched at boot time. When an interrupt "I" is raised, the daemon immediately rearms the interrupt for a next one to occur, and becomes in a sleep mode during which any new interrupt is catched. The set of files are scanned to determine the modifications only at the end of the sleep mode. Setting the duration of the sleep mode as twice the time needed to compute all the MD5 signatures is a preferred choice, though other can be used as well depending on the mean machine charge—the bigger the charge, the greater duration. Finally a basis for the duration of the sleep mode at low charge can be computed at boot time and its value adjusted according to that boot time value, the load factor of the system, and the maximum accepted time to get a first list of modified files.

The present description has been presented to enable one or ordinary skill in the art to make and use the invention and has been provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The invention claimed is:

1. A method of detecting real-time system file intrusions in a user computer that is coupled to an administrator computer, said user computer comprising an operating system and a plurality of system files, said method comprising:

receiving, by an application program interface (API) of the operating system at a boot time of the user computer, a list of vital system files of the plurality of system files as a protected set of system files, wherein the vital system files consists of a plurality of directory files, wherein each directory file comprises a name and location of a plurality of simple files, wherein the API is configured to synchronize file information displayed in computer windows of the user computer with the real files managed by the operating system, wherein the operating system comprises a kernel that cannot be modified after the boot time, wherein said declaring comprises storing the list of vital system files in a table in a kernel space within the kernel, and wherein the vital system files comprises the table and code that uses the table;

launching at the boot time as many daemons as the total number of said directory files plus one such that each directory file is assigned to a unique daemon of said daemons for being monitored by the unique daemon, wherein said launching comprises: randomly choosing daemon names for said daemons such that an intruder cannot determine which daemon monitors each directory file, and programming the daemons to monitor one another for affirming that none of the daemons has been killed for a while;

after said launching, detecting by the API a system call made to a first vital system file of the vital system files, wherein a first daemon of said daemons has been assigned for monitoring the first directory file;

responsive to said detecting, raising an automatic interrupt 'I' command by the API in relation to the first vital system file;

awakening, by the automatic interrupt 'I' command, a first daemon of said daemons that has been assigned for monitoring the first directory file, said first daemon being awakened from a sleep mode;

catching the interrupt 'I' command by the first daemon upon being awakened; and after said catching the interrupt 'I' command, sending an alert message, from the first daemon to the administrator computer, to alert the administrator computer of said detecting the system call made to the first vital system file, followed by the first daemon returning to the sleep mode.

2. A computer program product, comprising a computer usable storage medium having a computer readable program code embodied therein, said computer readable program code containing instructions that when executed by a processor implement the method of claim 1.

3. A system comprising a processor and a computer readable memory unit coupled to the processor, said memory unit containing instructions that when executed by the processor implement the method of claim 1.

4. A method of detecting real-time system file intrusions in a user computer that is coupled to an administrator computer, said user computer comprising an operating system and a plurality of system files, said method comprising:

receiving, by an application program interface (API) of the operating system at a boot time of the user computer, a list of vital system files of the plurality of system files as a protected set of system files, wherein the vital system files consists of a plurality of directory files, wherein each directory file comprises a name and location of a plurality of simple files, wherein the API is configured to synchronize file information displayed in computer windows of the user computer with the real files managed by the operating system, wherein the operating system comprises a kernel that cannot be modified after the boot time, wherein said declaring comprises storing the list of vital system files in a table in a kernel space within the kernel, and wherein the vital system files comprises the table and code that uses the table;

launching at the boot time a single daemon and no other daemon;

setting a sleep mode time duration, wherein the sleep mode time duration is either dependent upon a maximum time to obtain a list of the vital system files that have been monitored or equal to twice a time duration for MD5 signatures to be written for all vital system files in the list of vital system files;

after said launching the single daemon and after said setting the sleep mode time duration and during the sleep mode time duration, detecting by the API a plurality of system calls made to the vital system files during the sleep mode time duration;

responsive to each said detecting of a system call of the plurality of system calls made to the vital system files during the sleep mode time duration:

raising an automatic interrupt 'I' command by the API in relation to the vital system file to which a system call has been made and detected;

awakening, by the automatic interrupt 'I' command, the single daemon from a sleep mode;

catching the interrupt 'I' command by the single daemon upon being awakened;

rearming, by the single daemon after said catching the interrupt 'I' command, for the next interrupt 'I' command to occur during the sleep mode time duration, followed by returning by the single daemon to the sleep mode;

upon elapse of the sleep mode time duration, sending an alert message, from the first daemon to the administrator computer, to alert the administrator computer of said detecting the plurality of system calls made to the vital system files during the sleep mode time duration.

5. The method of claim 4, wherein the sleep mode time duration is dependent upon the maximum time to obtain a list of the vital system files that have been monitored.

6. The method of claim 4, wherein the sleep mode time duration is equal to twice the time duration for MD5 signatures to be written for all vital system files in the list of vital system files.

7. A computer program product, comprising a computer usable storage medium having a computer readable program code embodied therein, said computer readable program code containing instructions that when executed by a processor implement the method of claim 4.

8. A system comprising a processor and a computer readable memory unit coupled to the processor, said memory unit containing instructions that when executed by the processor implement the method of claim 4.

* * * * *